United States Patent [19]
Maucher

[11] 3,779,353
[45] Dec. 18, 1973

[54] FRICTION CLUTCH, ESPECIALLY FOR MOTOR VEHICLES

[75] Inventor: Paul Maucher, Sasbach, Germany

[73] Assignee: Luk Lamellen und Kupplungsbau GmbH, Buhl (Baden), Germany

[22] Filed: Feb. 24, 1971

[21] Appl. No.: 118,364

[30] Foreign Application Priority Data
Feb. 24, 1970   Germany............... P 20 08 424.6
Dec. 18, 1970   Germany............... P 20 62 410.6

[52] U.S. Cl.............. 192/70, 192/70.2, 192/70.29, 192/70.3, 192/89 B, 192/99 A
[51] Int. Cl............................................. F16d 13/44
[58] Field of Search.................. 192/70.29, 70.2, 192/70.3, 89 B, 99 A, 70, 70.18

[56] References Cited
UNITED STATES PATENTS

| | | | |
|---|---|---|---|
| 3,590,968 | 7/1971 | Binder................. | 192/99 A |
| 3,245,499 | 4/1966 | Kershner............ | 192/70 X |
| 2,211,192 | 8/1940 | Wolfram............ | 192/70.18 |
| 3,061,062 | 10/1962 | Smirl................. | 192/70.18 |
| 2,387,039 | 10/1945 | Parrett.............. | 188/71.4 |
| 2,436,817 | 3/1948 | Miller................ | 192/99 A X |
| 3,179,220 | 4/1965 | Sink................... | 192/99 A X |
| 3,212,611 | 10/1965 | Ruoff et al......... | 192/70.3 X |
| 3,215,233 | 11/1965 | Smith et al........ | 192/70.3 X |
| 3,224,531 | 12/1965 | Thompson......... | 192/70 X |
| 3,424,288 | 1/1969 | Sink................... | 192/70.29 X |

FOREIGN PATENTS OR APPLICATIONS
585,566   11/1958   Italy................... 192/99 A Primary Examiner—Allan D. Herrmann
Attorney—Curt M. Avery et al.

[57] ABSTRACT

Friction clutch, especially for motor vehicles, includes a housing, a pair of torque-transmitting friction discs disposed in the housing, a respective pressure plate located adjacent each of the friction discs, lever means operatively connected to the pressure plates and actuable for displacing the pressure plates in axial direction of the clutch, the pressure plates having friction surfaces facing away from one another and being formed with annular seats on respective surfaces thereof facing toward one another, a plate spring disposed between the pressure plates and engaging the annular seats, the housing being securable to a flywheel and being formed with a reaction surface engageable by one of the friction discs, the flywheel having a reaction surface engageable by the other of the friction discs, and means for rotationally entraining the pressure plates, both of the friction discs having respective hubs mountable on a single driven member for transmitting torque thereto.

8 Claims, 12 Drawing Figures

FRICTION CLUTCH, ESPECIALLY FOR MOTOR VEHICLES

The invention relates to friction clutch, especially for motor vehicles.

For the purpose of transmitting the usually very high power in heavy truck constructions, double disc clutches are often used which, against expectations, do not transmit double the power that is transmitted by corresponding single disc clutches of the same dimensions and with the same friction diameter. Attempts were therefore made to produce optimal conditions by using single disc clutches of suitably larger dimensions. However, this requires an enormous diameter for the clutch ball, and construction difficulties result therefrom because the entire motor transmission unit must be located at a sufficiently high level in order to ensure the required ground clearance. In the case of motors which are mounted beneath the floor this necessitates a very large space requirement and because of that the useful space is lost.

In double disc clutches that have become known, for example, in German Patent No. 738,516, there are located in sequence within a pot-shaped flywheel whose base is constructed as a counter pressure surface, an axially displaceable friction disc, an axially displaceable pressure plate with the two friction surfaces, a second axially displaceable friction disc, as well as a second axially displaceable pressure plate. The last-mentioned pressure plate is subjected to the biasing action of helical compression springs and the pressure from these springs is transmitted from there to the second friction disc and from the latter to the first pressure plate and then further to the first friction disc which is then pressed with its friction covering against the counter pressure surface of the pot-shaped flywheel.

Clutches of this type have a number of disadvantages which set narrow limits on their load capacity and thereby on the possibilities of the use or operation thereof. Thus, for example, the transmittable power is considerably lower on the corresponding load value of two single disc clutches because, due to the simultaneous frictional force of both friction discs which is applied to the one pressure plate located therebetween, very high temperatures are produced which moreover cannot be dissipated especially because of the type of construction of the clutch. In addition, the compressive force at the first clutch disc is smaller due to the friction in the axial guides, whereby the transmission moment of at least this clutch disc becomes smaller resulting in an increased wear of the second clutch disc with respect to the first clutch disc. Furthermore, the removal and the engagement of the pressure plates takes place differently with the friction disc and under different pressure ratios so that an irregular, excessive wear occurs.

Clutches have become known of the type, for example, disclosed in German Published Application No. 1,294,223, which have proved their value both in thermal respect as well as with respect to their ruggedness under the most extreme operating conditions and, in fact, are double friction clutches for tractors, equipment carriers and similar motor vehicles. These clutches are formed of a respective clutch member for a variable gear transmission and for an auxiliary drive wherein the clutch members can be separated or connected in series and transmit a torque separately to a transmission and to an auxiliary drive, for example, a feeder shaft. Two friction discs are provided for transmitting torque respectively having their own pressure plates displaceable axially through a lever system, the pressure plates provided with friction surfaces facing away from one another being engageable by a plate spring loated therebetween and abutting annular seats on the pressure plates, as well as a housing which is securable to the flywheel and is provided with a reaction or counteracting surface engageable with the one of the friction discs, the flywheel serving as a reaction or counteracting surface for the other friction disc, as well as means for rotationally entraining the pressure plates.

It is an object of the invention to provide a double disc clutch which is capable of transmitting double the power, for equal radial dimensions, as single disc clutches of the same order of magnitude.

It is a further object of the invention that the thermal load capacity should also be maintained with respect to the heretofore employed single clutches which, for example, occur very frequently under difficult starting-up operations in hilly terrain and which often extend over long periods of time.

It is another object of the invention to provide such a double disc clutch having an especially great durability, simple construction and high functional reliability.

It is still a further object of the invention to provide an improvement over the heretofore known clutches of this general type which, for the same axial dimensions, is capable to transmit double the power transmittable by single disc clutches.

With the foregoing and other objects in view, there is provided in accordance with the invention, a friction clutch comprising a housing, a pair of torque-transmitting friction discs disposed in the housing, a respective pressure plate located adjacent each of the friction discs, lever means operatively connected to the pressure plates and actuable for displacing the pressure plates in axial direction of the clutch, the pressure plates having friction surfaces facing away from one another and being formed with annular seats on respective surfaces thereof facing toward one another, a plate spring disposed between the pressure plates and engaging the annular seats, the housing being securable to a flywheel and being formed with a reaction surface engageable by one of the friction discs, the flywheel having a reaction surface engageable by the other of the friction discs, and means for rotationally entraining the pressure plates, both of the friction fiscs having respective hubs mountable on a single drive member for transmitting torque thereto.

Further in accordance with the invention, the single drive member, for example, the transmission shaft, can be constructed as a step shaft, so that each hub can be seated on a profile of different diameter and/or different shape. In by far most cases, it is advantageous in accordance with the invention for both hubs to have similar profiles, because then, the construction of the conventionally toothed transmission shaft is markedly simplified.

In accordance with another feature of the invention, the lever means comprises respective lever systems for each of the pressure plates, the lever systems being actuable substantially in parallel by a common member for lifting both of the pressure plates, the lever means being adapted to effect a substantially simultaneously instituted oppositely directed displacement of the pressure plates. For this, one of the lever systems is formed of a two-arm lever pivotally mounted on the housing and having a connecting means for pulling one of the pressure plates in lifting direction while the second lever system is a one-arm lever also pivotally mounted on the housing. The one-arm lever system has at least one compression member for the purpose of disengaging the clutch, the compression member serving to transform the pivoting movement of this lever system into an axial lifting movement of the pressure plate.

In accordance with another feature of the invention, the common member is an annular compression member articulatingly connected to at least the levers of one of the lever systems, and has a side thereof facing the levers of the one lever system and formed with profiled sections on a radially inner region of the levers, for example, at the dome thereof and is biased advantageously by resilient means. These resilient means serve simultaneously for returning the compression member at the levers, for resiliently biasing the compression member against the levers and for form- and force-lockingly bracing the levers with the disengaging members thereof, namely the tension and compression members.

The levers of the other system abut profiled sections of the compression member, in accordance with an added feature of the invention. In many cases, it is sufficient if these levers engage smooth surface portions of, for example, a circularly formed compression member.

In accordance with another feature of the invention, the means for rotationally entraining the pressure plates comprise leaf spring members securable, on the one hand, to the pressure plates and, on the other hand, to at least one of the housing and the flywheel, for example by rivets or screws.

In accordance with other features of the invention, the leaf springs are formed of U-shaped loops and are attached at given points to the pressure plates on the one hand, and to at least the housing or the flywheel or both, on the other hand, the leaf-springs extending at various angles from the points of attachment on the pressure plates to the points of attachment on at least the housing or the flywheel or both. The loop section of the U-shaped loops can either face toward the connecting points at the pressure plate or at the housing.

In accordance with an additional feature of the invention, the points of attachment on the pressure plates are either staggered radially or circumferentially or both.

In accordance with other features of the invention, the single-armed levers form a knife-edge bearing with a respective bearing member provided at the housing. The bearing members are formed as bearing stands and have a wall projecting substantially in axial direction of the clutch and extending in circumferential or tangential direction, the wall having a given profiling, and the one-arm levers having a corresponding counter-profiling abutting the given profiling. Thereby, the levers can be secured at the bearing block from movement in circumferential, axial and radial directions.

In accordance with a further feature of the invention, both the bearing stand as well as the levers can be formed of sheet metal profile members.

In accordance with yet another feature of the invention, the one-arm levers have, radially inwardly of the bearing stand, a contact member engageable with one end of a compression pin slideably supported in a guide formed in the housing and having an end facing away from the contact member and abutting an absorption means of the one pressure plate.

In accordance with still other features of the invention, the contact member is adjustable in the level thereof in order to be able to adjust the instant of disengagement of this one pressure plate, in order to accommodate for wear, and in order to assure a uniform adjustment of all three levers of this system. With this, the contact member is provided with a threaded portion threadedly secured in a threaded bushing, which has a flange abutting a side of the one-arm lever facing the housing, a counteracting nut being located at the other side of the one-arm lever. By this means, the contact member is simultaneously adjustable in level, and a force-locking connection between the contact member, the threaded bushing and the levers is attainable.

In accordance with a concomitant feature of the invention the means for rotationally entraining the pressure plates include leaf springs securable on the one hand to the housing and on the other hand to the pressure plates, the bearing stands and at least one of the leaf springs being securable to the housing by a common fastening member.

In accordance with another feature of the invention, the double-arm levers include a radially outwardly extending lever connected to a tension member, the tension member being, in form, oparatively engageable with one of the pressure plates, the double-arm levers having bearings constructed as rocker bearings.

The invention also includes the feature of a pin secured to the housing and extending substantially parallel to the clutch axis, the double-arm levers enclasping the pin. The pin is pormed with a knurled portion located in press-fitting engagement within a bore formed in the housing. In such case, the two-arm lever can be a sheet-metal profile member.

In accordance with a further feature of the invention the double-arm-lever is formed with an oval opening extending in radial direction, the pin being received within the oval opening which, as viewed in circumferential direction, is fitted to the diameter of the pin and forms with a radially inner region thereof an abutment for the pin.

In accordance with additional features of the invention, the double-arm-lever is formed with an oval opening extending in radial direction, the pin being received within the oval opening which, as viewed in circumferential direction, is fitted to the diameter of the pin and forms with a radially inner region thereof an abutment for the pin.

In accordance with additional features of the invention, a plate member surrounds the pin, and the double-arm lever abuts the plate member, which may be of arched construction. The double-arm lever has a flat surface engageable with the plate member, and the latter may be formed of wear-resistant material.

In accordance with other features of the invention, an anti-torsion device is located between the double-arm lever and the plate member.

In accordance with a different feature of the invention, the rocker bearings are formed by a member having a substantially spherical surface, the double-arm lever having a corresponding counter profiling engaging the spherical surface.

In accordance with added features of the invention, an arm extends from the double-arm lever in axial direction of the clutch and abuts the housing. A plate-like member of wear resistant material is located on the housing, the arm extending from the double-arm lever being in engagement with the plate-like member.

According to another feature of the invention, a bearing member is secured to the housing and has a wall projecting substantially in axial direction of the clutch and extensible in circumferential direction of the clutch, the bearing member having at least one profiling, the double-arm lever having a corresponding counter-profiling of the bearing member, and forming with the the bearing member a knife-edge bearing. Furthermore, either the double-arm lever or the bearing member or both are sheet metal profile members.

In accordance with another feature of the invention, there is provided means for guiding movement of the pivotable single and double-arm levers in pivoting direction thereof, the guiding means being located radially inwardly of the contact member and comprising a pin secured to the housing. The guiding means is also located radially inwardly of the plate member. Stop means are located in a radially inner region of the single and double arm levers for limiting pivotal movement of the pivotally mounted single and double arm levers in direction opposite to the housing. The stop means also comprise a pin secured to the housing. The pins are also provided with an annular shoulder-forming member engageable by the double-arm lever. The guiding pin is formed with knurl portion press-fitted in a bore formed in the housing. The stop pin is of similar construction and is similarly press-fitted in a bore formed in the housing.

In accordance with an additional feature of the invention there is provided a bar spring engaging the lever means for bracing the same, the bar spring having a first force arm engaging the lever means, a second force arm engaging the housing and spring windings between the force arms thereof, the second force arm being in engagement with the lever means at an angle of inclination for forming a resultant force that causes the windings of of the bar spring to abut the housing in all operating positions of the lever means at the housing.

Other features which are considered as characteristic for the invention are set forth in the appended claims.

Although the invention is illustrated and described herein as embodied in friction clutch, especially for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
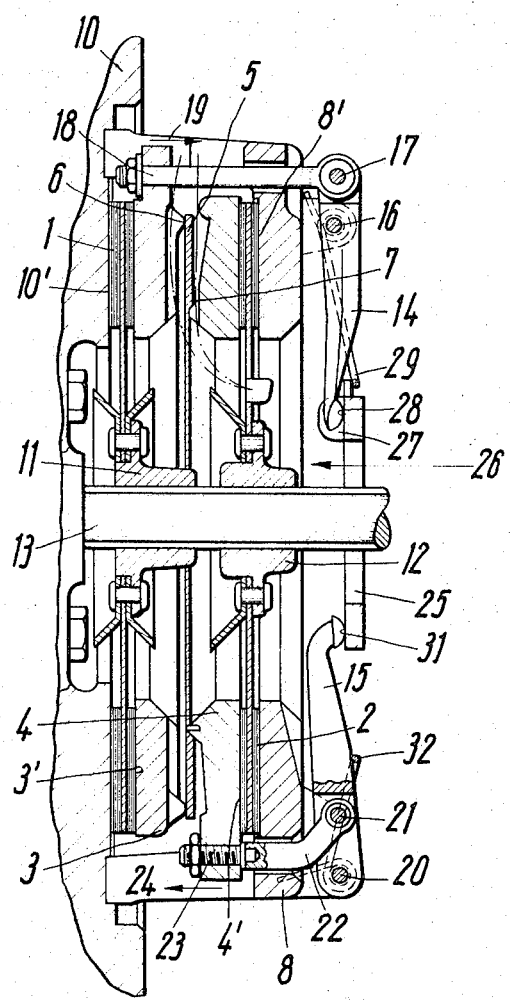
FIG. 1 is a sectional view of the friction clutch constructed in accordance with the invention.
Figure 2:
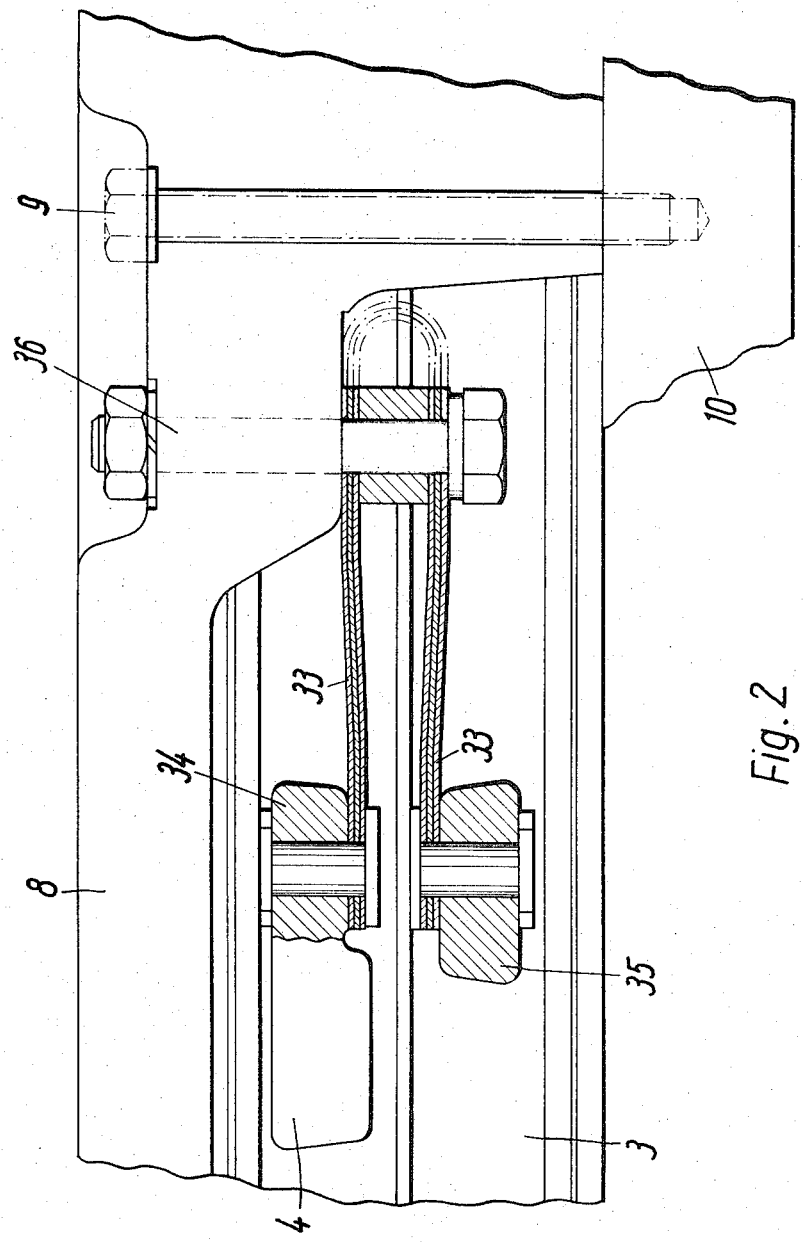
FIG. 2 is a much-enlarged fragmentary view of FIG. 1.

Referring now to the drawings and first, particularly to FIGS. 1 and 2 thereof, there is shown a friction clutch, especially for motor vehicles, constructed in accordance with the invention, having two friction discs 1 and 2 for torque transmission and a respective axially displaceable pressure plate 3 and 4 for the friction discs 1 and 2. Both pressure plates 3 and 4 are provided with friction surfaces 3' and 4', respectively, facing away from one another. A plate spring 5 is disposed between the pressure plates 3 and 4 and is prestressed so as to abut projecting seats 6 and 7 of both pressure plates 3 and 4, respectively, in a conventional manner, and thereby press both pressure plates 3 and 4 against the friction discs 1 and 2, respectively.

A housing 8 of the clutch is provided with a counter-pressure or reaction surface 8' for the friction disc 2 and is securable by screws 9 to a flywheel 10. The flywheel 10 has a friction surface 10' which is formed as a counterpressure or reaction surface for the friction disc 1.

The friction discs 1 and 2 are provided with respective hubs 11 and 12 which, in the embodiment of FIG. 1, have a similar profile for transmitting torque to a single driven member, namely a transmission shaft 13.

To lift both pressure plates 3 and 4, there is provided for each of the pressure plates, its own lever system 14 and 15, advantageously having respectively three levers. The levers of the lever system 14 are formed as double-armed levers and are swingably mounted at 16 on the housing 8. A tie rod 18 is articulatingly connected through a radially further outwardly disposed lever arm by means of a pin or bolt 17. Thus, by means of the levers of the lever system 14, the pressure plate 3 is liftable from the friction disc 1 in direction of the arrow 19.

The levers of the lever system 15 are formed of single-arm levers that are pivotable about a pin 20 secured to the housing 8. Radially further inwardly a compression member 22 is articulatingly secured by a pivot 21, the compression member 22 abutting an adjusting screw 23 which is threadedly secured to the pressure plate 4. Thus, by means of the levers of the lever system 15, a disengaging movement of the pressure plate 4 is effected in direction of the arrow 24.

Actuation of the friction clutch of the invention is effected through both lever systems 14 and 15 in parallel by means of a common member, namely a compression member 25, it being especially advantageous that the actuation of both lever systems be effected at least substantially simultaneously because then the least possible wear occurs at the friction discs 1 and 2.

The levers 14 and 15 and adjustable by means of the tie rod 18 and the adjusting screw 23, respectively, so that the lift or disengagement of the pressure plates 3 and 4 occurs simultaneously.

The compression member 25 is swung or shifted by a non-illustrated disengaging lever in direction of the arrow 26, which effects an opposite lift of the pressure plates 3 and 4, by means of the lever systems 14 and 15, in direction of the arrows 19 and 24. The compression member 25 is formed with profiled sections 27 facing the levers of the lever system, and is biased by resilient means, namely by bar springs 29 so that the profiled sections 27 engage rounded heads 28 of the lever system 14, the spring 29 serving simultaneously for retaining the compression member 25, for resiliently pressing the same against the levers and as a prestress within the disengaging system 14, 18.

For the levers of the lever system 15, the compression member may also be provided with profiled sections within which the rounded heads 31 of the levers 15 may lie, however, in the embodiment illustrated in FIG. 1, the heads 31 of the lever system 15 abut a flat surface portion of the compression member 25. The prestress within the lever system 15 is produced through the bar springs 32.

As seen in FIG. 2, leaf spring members 33 are provided for rotationally lockingly entraining the pressure plates 3 and 4. The leaf spring members 33, on the one hand, are riveted to radially projecting cams 34 and 35 of the pressure plates 4 and 3 respectively, and on the other hand, are threadedly secured by a bolt 36 to the housing 8. In many cases, it may be advantageous, if the leaf spring members 33 are formed at least of one U-shaped bent loop, the bent connecting piece between the legs of such a U-loop being shown by dot-dash lines in FIG. 2.

In many instances, it may also be especially desirable for the points of attachment to the pressure plates to be mutually offset radially and/or circumferentially, because assembly can then be markedly simplified.

It can be seen that friction clutches according to FIGS. 1 and 2 of the invention in the instant application, have a number of significant advantages over the heretofore known double disc clutches. Thus, for example, by using for each friction disc its own pressure plate, the heat absorption capacity and the heat transmission are markedly improved over that for the heretofore known clutches of this general type. The heat transfer is further improved by the fact that the projecting seats 6 and 7 operate like turbine blades or buckets and produce a cooling air flow sweeping radially past the pressure plates 3 and 4 as well as the plate spring 5. This cooling air flow may be further intensified by providing the friction discs 2 either with air inlet openings or with blade or bucket-like air-moving means for an axially admitted air flow. Especially because of the exceptionally favorable construction of the friction clutch according to the invention, it is possible, with respect to thermal problems, to transfer actually double the produced heat than is possible for single disc clutches of the same order of magnitude. Also, the use of a single plate spring for applying pressure to both clutch discs affords significant advantages which are not attainable with the heretofore known two-disc clutches which have used helical compression springs heretofore. Thus, for example, by suitably constructing the plate spring, assurance can be provided that over the entire path of wear of the friction linings, the pressure will remain substantially constant and, moreover, a substantially uniform application or course of pressure will prevail along the disengaging path.

Furthermore, there is assured by the plate spring and the construction that the pressure plates respectively, are placed with the same force on both clutch discs, thereby avoiding non-uniform wear of the friction linings and markedly increasing the longevity or durability of the clutch of the invention.

The forced lifting of the pressure plates 3 and 4 from the clutch discs 1 and 2, respectively, through the two lever systems 14 and 15 assures a trouble-free clutch disengaging operation, it being especially advantageous if the opposite lift of the two pressure plates 3 and 4 is effected substantially simultaneously and is in the same order of magnitude. The trouble-free clutch disengaging operation has as a result that, in the clutch disengaged condition, both clutch discs 1 and 2 can rotate freely with reliability so that wear of the friction lining is avoided in this condition and, moreover, synchronization in the transmission is not additionally stressed by the drag moment, as could not be reliably avoided with the heretofore used friction clutches.

In addition, the use of a common compression member 25 for both lever systems 14 and 15 and the articulating connection of the securing thereof, as well as the retention of the compression member 25 at the ends of the levers of the one lever system 14 afford considerable advantage. For example, due to the use of only one compression member, a marked economy is achieved. Furthermore, due to this construction, it is possible by the sole use of restoring springs at one set of levers to bias the compression member against the levers of both lever systems 14 and 15 in order to prestress them both.

Figure 3:
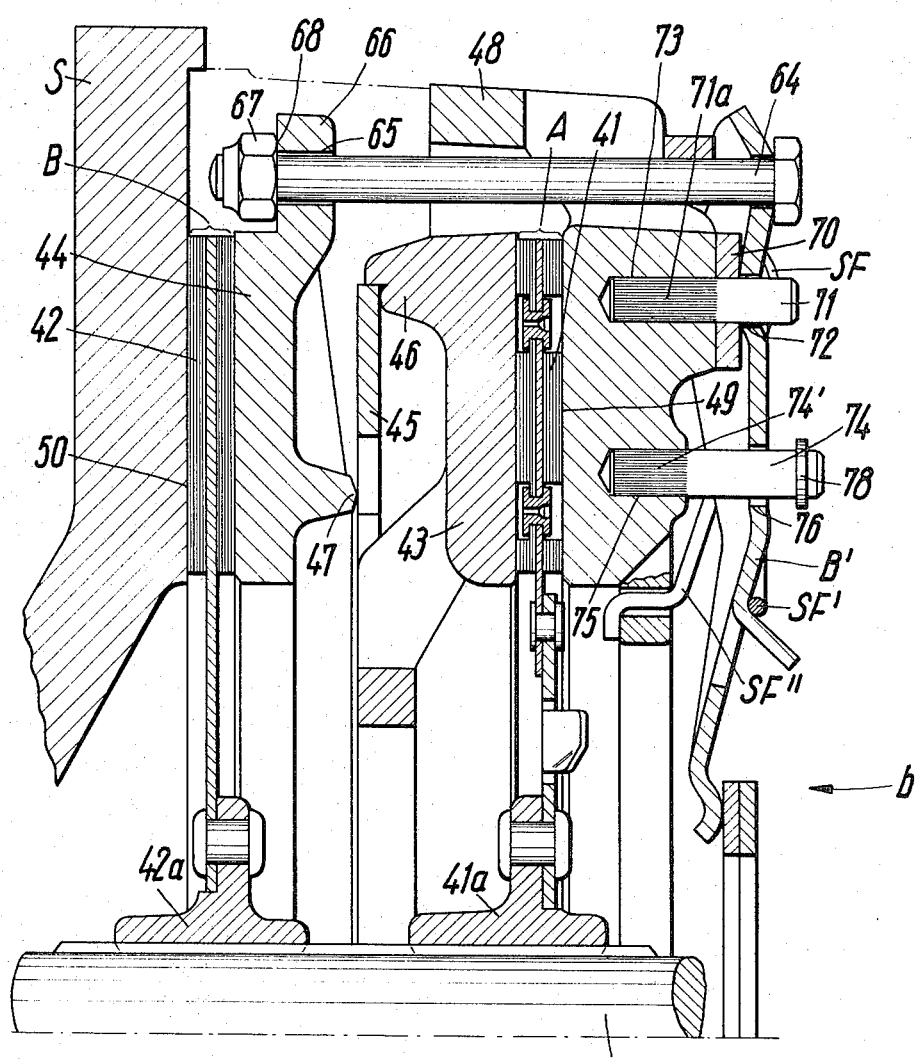
FIGS. 3 and 4 are upper and lower half sectional views, respectively, of another embodiment of the friction clutch.
Figure 4:
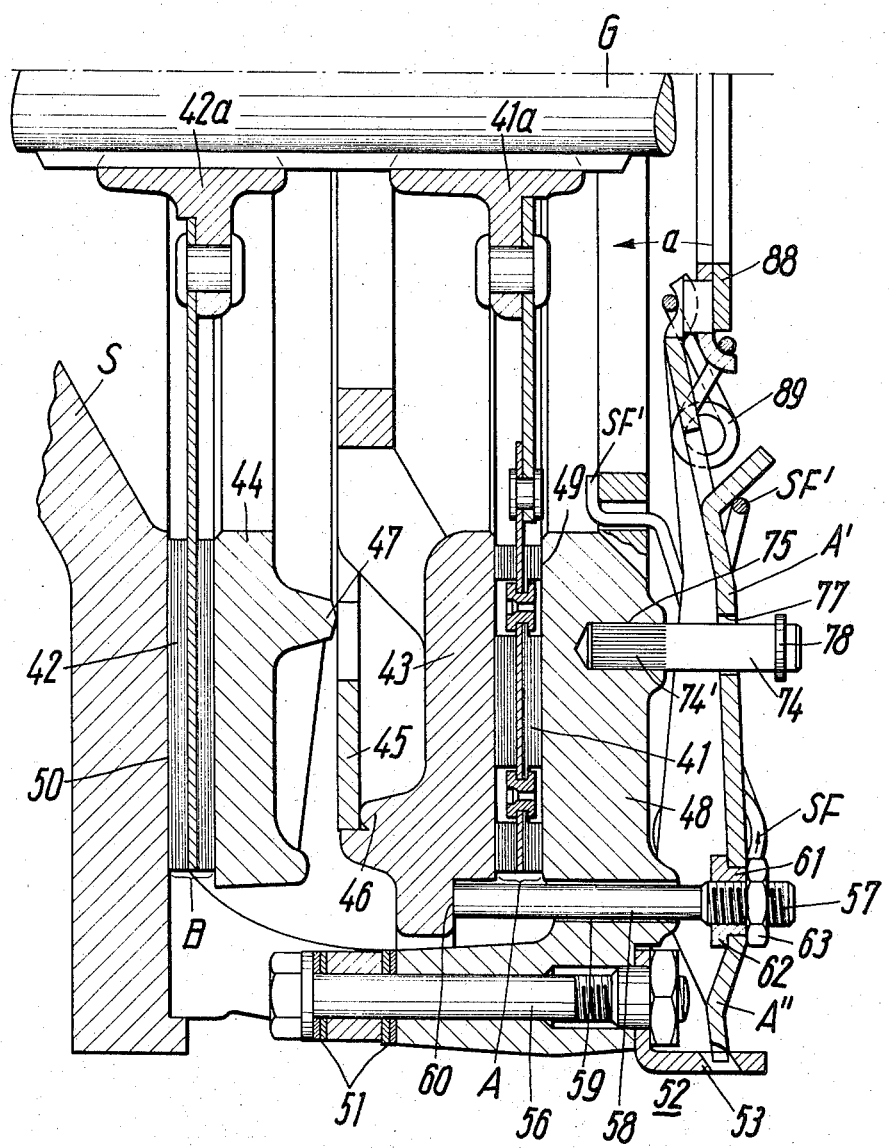

The embodiment of the invention shown in FIGS. 3 and 4 is a double disc clutch formed of a first clutch member A and a second clutch member B, the clutch member A being provided with a friction disc 41 while the clutch member B has a friction disc 42, both of the clutch members A and B including respective hubs 41a and 42a that are fixed against radial movement though axially displaceable on a transmission shaft G. Furthermore, the clutch member A includes a pressure plate 43, and the clutch member B, a pressure 44, which are engageable with friction surfaces at the discs 41 and 42, respectively. The pressure plates 43 and 44 are subjected to the biasing action of a plate spring 45 which abuts radially outwardly on cams or bead-like prominences 46 of the pressure plate 43 and further radially inwardly on bead-like prominences or cams 47 formed on the pressure plate 44, from which both pressure plates 43 and 44 receive their spring loading or stressing.

Both clutch members A and B are mounted in a common housing 48 which is provided with a counterpressure or reaction surface 49 for the clutch disc 41. A flywheel S, to which the housing 48 is bolted by non-illustrated means in a conventional manner, provides a counterpressure surface 50 for the clutch member B.

In a conventionally known manner, leaf springs 51 are employed for effecting torque transmission between the housing 48 and both pressure plates 43 and 44.

To lift the pressure plates, there are distributed over the periphery of the housing 48, two systems or groups A' and B' of three levers each that are swingably or pivotablly mounted at the housing 48. The levers of the system A' are single-armed and are so disposed that when they are pivoted in direction of the arrow a, they exert a pressure on the pressure plate 43 and lift the latter from the friction disc 41.

Figure 5:
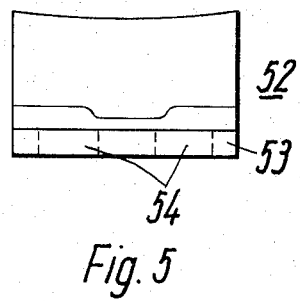
FIGS. 5, 6 and 7 are respective elevational plan and sectional views of a detail of FIG. 4.
Figure 7:
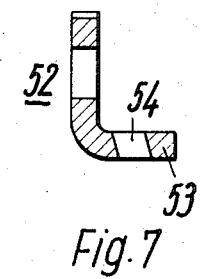
Figure 6:
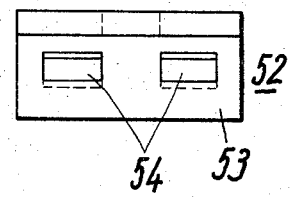
Figure 8:
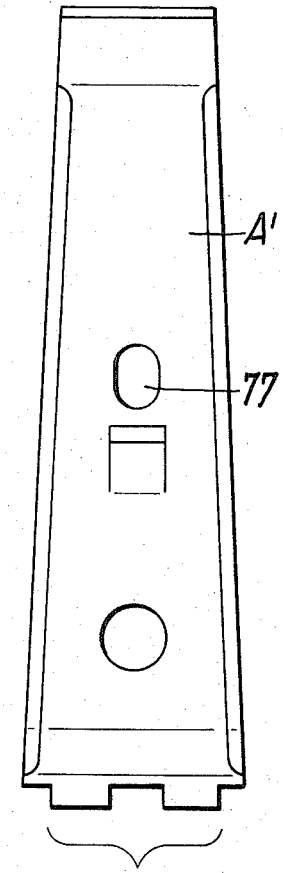
FIG. 8 is a front elevational view of another detail of FIG. 4.
Figure 9:
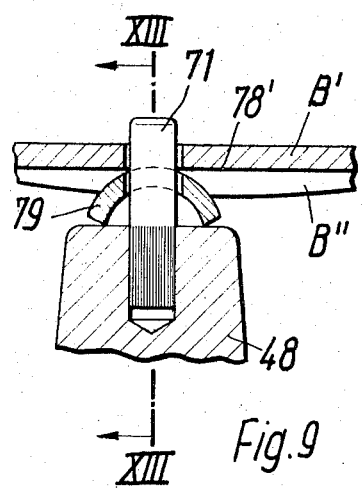
FIG. 9 is a fragmentary view in section of a modification of the clutch of FIG. 3.
Figure 10:
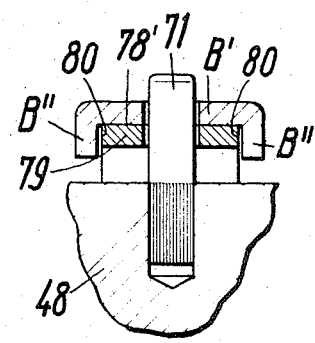
FIG. 10 is a sectional view of FIG. 9 taken along the line X — X in the direction of the arrows.

The lever system A' forms through its radially outer lever arm A" a knife-edge bearing with a bearing member 52. The latter bearing member is illustrated in greater detail in FIGS. 5 to 7, and the lever system A' is also shown more clearly in FIG. 8.

The bearing member 52, which is formed as a bearing stand in the embodiment of FIGS. 3 and 4, has a wall 53 which projects substantially in axial direction of the clutch of the invention, and extends in circumferential or tangential direction. This bearing stand 52 is provided with profiles 54 against which the lever system A', formed with corresponding counter-profiles, abuts. Thereby, the levers of the system A' are secured against displacement at the bearing stand 52 in circumferential, axial and radial directions.

By means of a bolt 56, both the bearing stand 52, as well as the leaf springs 51 are secured to the housing 48.

Radially inward the bearing stand 52, the lever system A' is provided with a contact member 57 i.e. a worm screw in the embodiment of FIGS. 3 and 4, which lies on one end of a compression pin 58. The compression pin 58 is slidingly mounted in a guide 59 of the housing 48, and has another end by which it is seated on the absorption means of the pressure plate 43, namely a cam 60.

The contact member 57 is adjustable in level by means of a threaded bushing 61 formed with a flange 62 and by means of a counteracting nut 63. The lever system A' is clamped between the flange 62 and the counteracting nut 63.

The system B' of double-armed levers is swung or pivoted in direction of the arrow b for the purpose of clutch disengagement, and thereby exerts tension on the pressure plate 44 through a tension member 64, which is gripped by the lever system B', the pressure plate 44 being accordingly lifted from the disc 42 against the biasing force of the spring 45.

The tension members 64 are shown in the embodiment of FIGS. 3 and 4 as bolts which extend through a bore 65 of a cam 66 formed on the pressure plate 44. A nut 67, threaded on the tension members 64, abuts the surface 68 of the cam 66. In the illustrated embodiment of FIGS. 3 and 4, both the bore 65 and the surface 68 serve as absorption or articulating means for the bolt 64 functioning as clutch disengaging means and the nut 67.

The levers of the system B' have a seesaw or rocker bearing i.e. they have a substantially spherical or ball-like surface 69 abutting a substantially flat, hardened disc 70 and can effect swinging movements on this disc 70. The lever system B' is formed with an oval bore 72 through which a pin 71 extends. The oval bore 72 in peripheral direction conforms to the diameter of the pin 71. The radially inner region of the oval opening 72 abuts the pin 71 so that the lever system B' is additionally secured against the action of centrifugal force. The pins 71 are provided with a knurled region 71a and this region of the pins is driven into a bore 73 formed in the housing 48.

Both the lever systems A' and B' are formed with a bore in the radially inner region thereof through which a respective pin 74 extends, the pin 74 having a knurled region which is driven or press-fitted into a respective bore 75 formed in the housing 48. The pins 74 serve together with the bores 76 and 77 in the levers A' and B' as a guide for the levers in the swinging or pivoting direction thereof.

Snap rings 78 are provided on the pins 74 and serve as stop means for limiting the swinging movement of the levers in direction away from the housing 48.

The seesaw bearing for the lever system B', as shown in FIGS. 9 to 12, can also however be formed in other ways. For example, in FIG. 9, the lever system B' has a flat roll-off surface 78' and forms the seesaw bearing with a platelet or small disc 79 having an arched construction. It is expedient to provide a safety device against torsion between the lever system B' and the platelet 79, in accordance with FIG. 10 which is a cross section-al view of FIG. 9 taken along the lines X — X. This anti-torsion safety device is constructed by forming the platelet 79 with contours 80 which substantially conform to the squared-off region B'' and is at least there overlapped by the regions B''.

Figure 11:
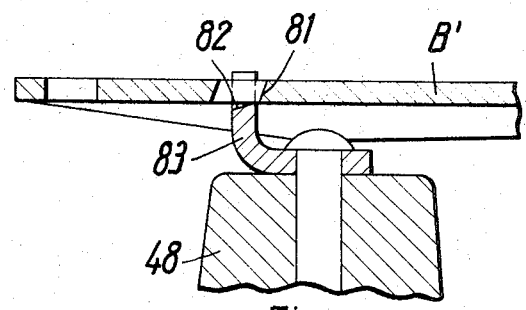
FIGS. 11 and 12 are fragmentary sectional views similar to FIG. 9 of other modifications of the friction clutch of the invention.

FIG. 11 shows a seesaw bearing for the lever system B' wherein the latter is provided with profiles 81 with which it is superposed on counter-profiles 82 of a bearing member 83 which is, in turn, secured to the housing 48. The profiles 81 and 82 may be formed in a manner shown for the lever system A'.

Figure 12:
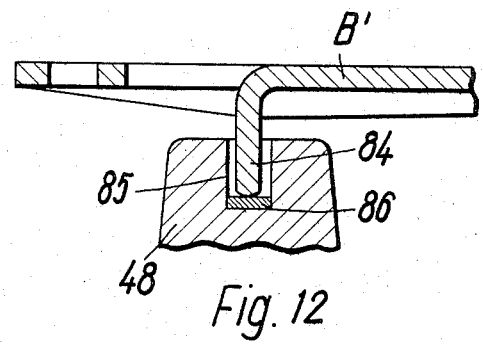

FIG. 12 shows the lever system B' with an arm 84 formed from the sheet material with which this lever system engages the housing 48. The arm 84 is received in a bore 85 formed in the housing 48 and is supported on a disc 86 with an end thereof formed as a blade.

From FIGS. 3 and 4, it is apparent that both lever systems A' and B' are stressed respectively by a bar spring SF. The force arm SF'' is fixed in the housing 48, while the other force arm SF' engages the lever system A' and B' at such an angle of inclination that a resultant is formed which causes the windings of the bar spring located between both force arms SF' and SF'' to abut the housing 48 in each operative position of the lever system.

A compression member 88 is articulatingly connected through the springs 89 to the rounded heads of the lever systems A' and B'. The compression member 88 can be held at the levers also through the springs SF.

I claim:

1. Friction clutch comprising a housing, a pair of torque-transmitting friction discs disposed in said housing, a respective pressure plate located adjacent each of said friction discs, lever means operatively connected to said pressure plates said lever means comprising respective lever systems for each of said pressure plates, said lever systems being actuable substantially in parallel by a common member movable in an axial direction of the clutch for lifting both of said pressure plates, said lever means being adapted to effect a substantially simultaneously instituted, oppositely directed displacement of said pressure plates, said common member being an annular compression member, and at least one of said lever systems has levers formed with support locations at the ends thereof, said compression member being resiliently biased into engagement with said support locations, said pressure plates having friction surfaces facing away from one another and being formed with annular seats on respective surfaces thereof facing toward one another, a plate spring disposed between said pressure plates and engaging said annular seats, said housing being securable to a flywheel and being formed with a reaction surface engageable by one of said friction discs, the flywheel having a reaction surface engageable by the other of said friction discs, and means for rotationally entraining said pressure plates, both of said friction discs having respective hubs mountable on a single driven member for transmitting torque thereto.

2. Friction clutch according to claim 1 including a disengaging member connected to one of said pressure plates, and spring means for resiliently biasing said compression member into engagement with said support locations, said spring means simultaneously serving as holder for said compression member and as a force-locking application of said one lever system to said disengaging member.

3. Friction clutch comprising a housing, a pair of torque-transmitting friction discs disposed in said housing, a respective pressure plate located adjacent each of said friction discs, lever means operatively connected to said pressure plates, a common member being movable to actuate said lever means for displacing said pressure plates substantially simultaneously in axial direction of the clutch, said pressure plates having friction surfaces facing away from one another and being formed with annular seats on respective surfaces thereof facing toward one another, a plate spring disposed between said pressure plates and engaging said annular seats, said housing being securable to a flywheel and being formed with a reaction surface engageable by one of said friction discs, the flywheel having a reaction surface engageable by the other of said friction discs, and means for rotationally entraining said pressure plates, said means for rotationally entraining said pressure plates comprising leaf spring members securable, on the one hand, to said pressure plates and, on the other hand, to at least one of said housing and said flywheel, said leaf springs being secured at their inner radial end portion to said pressure plates, both of said friction discs having respective hubs mountable on a single driven member for transmitting torque thereto.

4. Friction clutch according to claim 3 wherein said leaf spring members are formed of U-shaped loops.

5. Friction clutch according to claim 3 wherein said leaf spring members are attached at given points to said pressure plates, on the one hand, and to at least one of said housing and said flywheel, on the other hand, said leaf spring members extending at various angles from the points of attachment to at least one of said housing and said flywheel.

6. Friction clutch according to claim 5 wherein the points of attachment on said pressure plates are staggered radially.

7. Friction clutch according to claim 5 wherein the points of attachment on said pressure plates are staggered circumferentially.

8. Friction clutch comprising a housing, a pair of torque-transmitting friction discs disposed in said housing, a respective pressure plate located adjacent each of said friction discs, lever means operatively connected to said pressure plates, said lever means comprising respective lever systems for each of said pressure plates, said lever systems being actuable substantially in parallel by a common member for lifting both of said pressure plates, said lever means being adapted to effect a substantially simultaneously instituted, oppositely directed displacement of said pressure plates, said common member being an annular compression member, and at least one of said lever systems has levers formed with support locations at the ends thereof, said compression member having a side thereof facing said levers of said one lever system and formed with profiled sections, said compression member being resiliently biased so that said profile section on said compression member are resiliently biased into engagement with said support locations, and means for rotationally entraining said pressure plates, both of said friction discs having respective hubs mountable on a single driven member for transmitting torque thereto.

* * * * *